US00RE40019E

(19) United States
(12) Reissued Patent
Wang et al.

(10) Patent Number: US RE40,019 E
(45) Date of Reissued Patent: Jan. 22, 2008

(54) HIGH POWER HIGH EFFICIENCY CLADDING PUMPING FIBER LASER

(76) Inventors: Zhijiang Wang, 23637 Country View Dr., Diamond Bar, CA (US) 91765; Alice Z. Gheen, 97 Fairlake Ave., Irvine, CA (US) 92614; Ying Wang, 23637 Country View Dr., Diamond Bar, CA (US) 91765

(21) Appl. No.: 10/211,490

(22) Filed: Aug. 1, 2002

Related U.S. Patent Documents

Reissue of:
(64) Patent No.: 6,101,199
Issued: Aug. 8, 2000
Appl. No.: 09/225,616
Filed: Jan. 5, 1999

(51) Int. Cl.
*H01S 3/30* (2006.01)

(52) U.S. Cl. ..... 372/6; 372/66; 372/700; 385/123

(58) Field of Classification Search ..... 372/6, 372/64, 66, 72, 75, 700; 385/123–129, 146; 359/641, 663
See application file for complete search history.

(56) References Cited

U.S. PATENT DOCUMENTS 4,428,647 A * 1/1984 Sprague et al. ..... 359/20

(Continued)

OTHER PUBLICATIONS

Muendel, "35 Watt CW Singlemode Ytterbium Fiber Laser at 1.1 um." CLEO '97 Postdeppline Paper CPD 30 Baltimore MD 1997.*

*Primary Examiner*—Dung Nguyen

(57) ABSTRACT

[In the present invention, methods and apparatus for making efficient cladding pumping fiber lasers is disclosed. In particular, new fiber cladding geometry and new method of coupling pumping laser into an optical fiber are disclosed. Both aspects of the present invention will facilitate the realization of high-efficiency and high-power fiber lasers. In the present invention, cladding boundary geometry structures that can prevent the formation of local modes are disclosed. Besides the cladding geometry, methods for efficient coupling of diode lasers into a laser fiber for high power injection are also disclosed. Essentially, the new methods make it possible to transmit diode laser beams for a long distance with substantially the same brightness. In other words, with the methods and apparatus disclosed, a laser beam from a laser diode array with collimating structures can be transmitted for a long distance while the beam spot dimension including beam divergence can be kept substantially unchanged even if the beam from said array is not substantially collimated. With the method taught in the present invention, laser diode array modules can be formed with laser diode arrays (LDA) with collimating structures and relay systems. Because of the brightness conservation nature of the modules, when a plurality of such modules (such as 3, 9 or more than 200 pieces) are combined, the beams from the arrays can be efficiently coupled into an optical fiber. Thus the pumping laser coupling method can be used for the construction of high-efficiency and high-power fiber lasers. Thus, the fiber lasers of this invention may comprise of a fiber laser core doped with active species, a symmetry-broken inner cladding or a multiple-imaging inner cladding surrounding said core, a plurality of brightness substantially-conserved laser diode array module for coupling the beam from said laser diode array module into said inner cladding.] *An apparatus for a high efficiency cladding pumping fiber laser component includes a laser fiber having a core doped with active species disposed along an axis. A symmetry-broken inner cladding surrounds said core for transmitting optical energy from the inner cladding to said core. The symmetry-broken inner cladding has a substantially rectilinear cross-section with respect to the axis with at least two pair opposing sides. At least one side of each pair of each opposing sides is disposed in nonparallel relationship to its respective opposed side whereby the inner cladding has a symmetry-broken cross-section shape that minimizes local modes in the inner cladding.*

25 Claims, 17 Drawing Sheets

U.S. PATENT DOCUMENTS 4,520,472 A * 5/1985 Reno ..... 369/112.24
4,815,079 A * 3/1989 Snitzer et al. ..... 372/6
5,139,609 A * 8/1992 Fields et al. ..... 372/50
5,185,758 A * 2/1993 Fan et al. ..... 372/72
5,333,077 A * 7/1994 Legar et al. ..... 359/619
5,533,163 A * 7/1996 Muendel ..... 385/126
5,568,577 A * 10/1996 Hardy et al. ..... 385/33
5,579,422 A * 11/1996 Head et al. ..... 385/34
5,592,333 A * 1/1997 Lewis ..... 359/628
5,594,752 A * 1/1997 Endriz ..... 347/241
5,612,969 A * 3/1997 Dombi ..... 372/75
5,619,522 A * 4/1997 Dube ..... 372/72
5,761,233 A * 6/1998 Bruesselbach et al. ..... 372/72
5,790,310 A * 8/1998 Huang ..... 359/618
5,793,783 A * 8/1998 Endriz ..... 372/31
5,802,092 A * 9/1998 Endriz ..... 372/50
5,825,803 A * 10/1998 Labranche et al. ..... 372/101
5,978,407 A * 11/1999 Chang et al. ..... 372/72
6,075,912 A * 6/2000 Goodman ..... 385/33
6,215,598 B1 * 4/2001 Hwu ..... 359/641

* cited by examiner

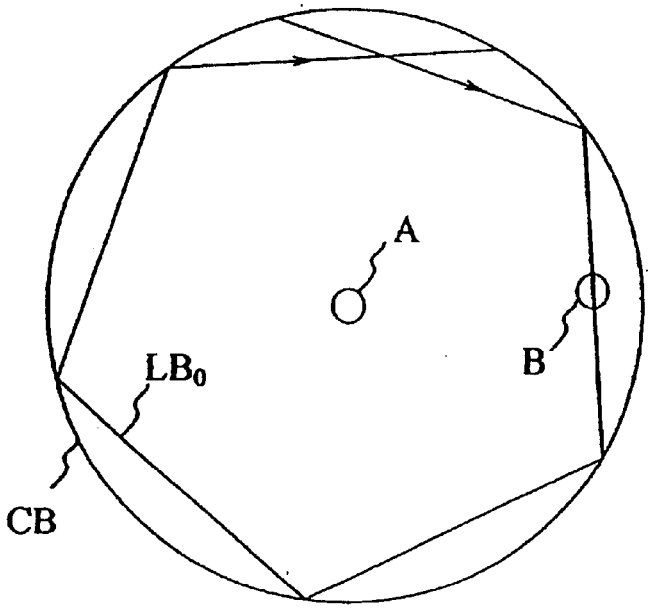
*Fig. 1 (Prior Art)*
*(Amended)*
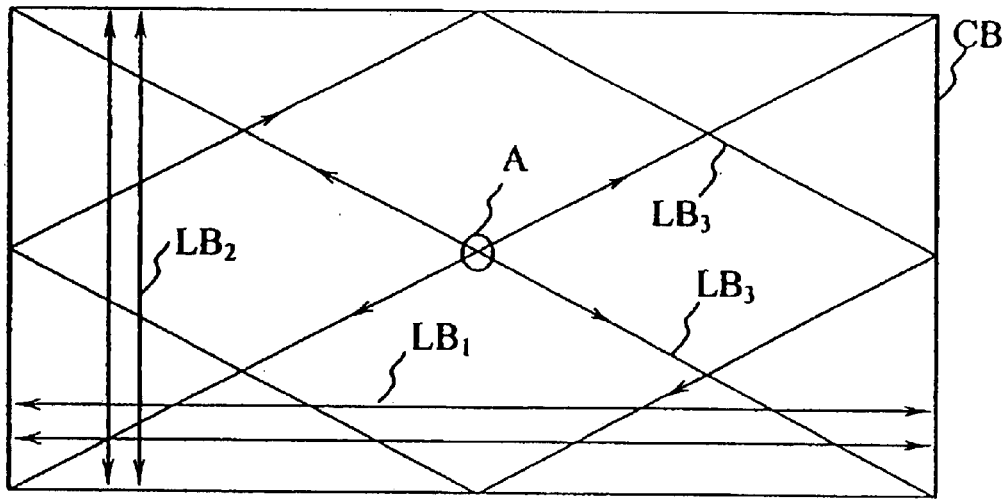
*Fig. 2 (Prior Art)*
*(Amended)*

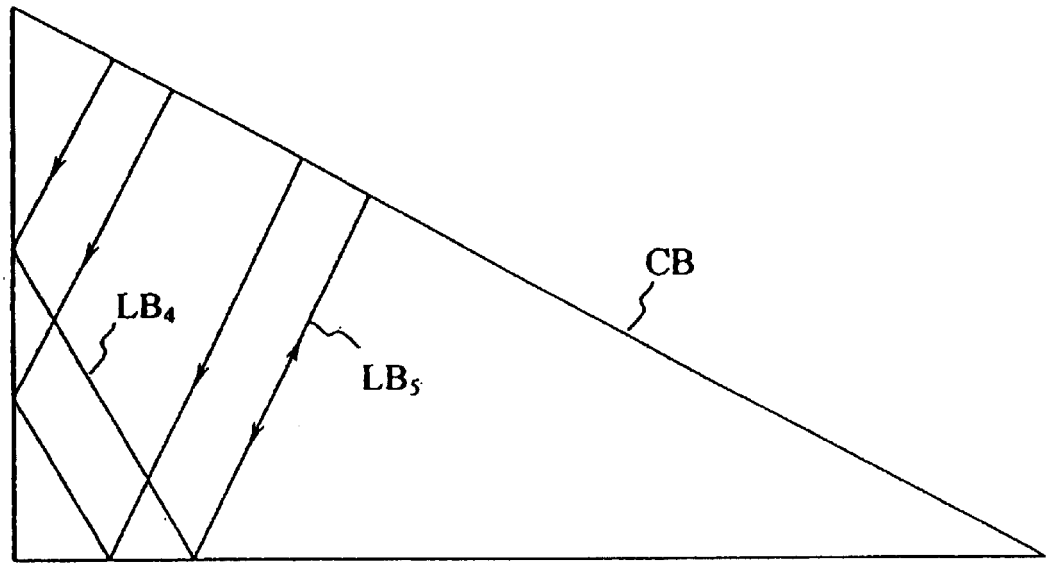
*Fig. 3 (Prior Art)*
*(Amended)*
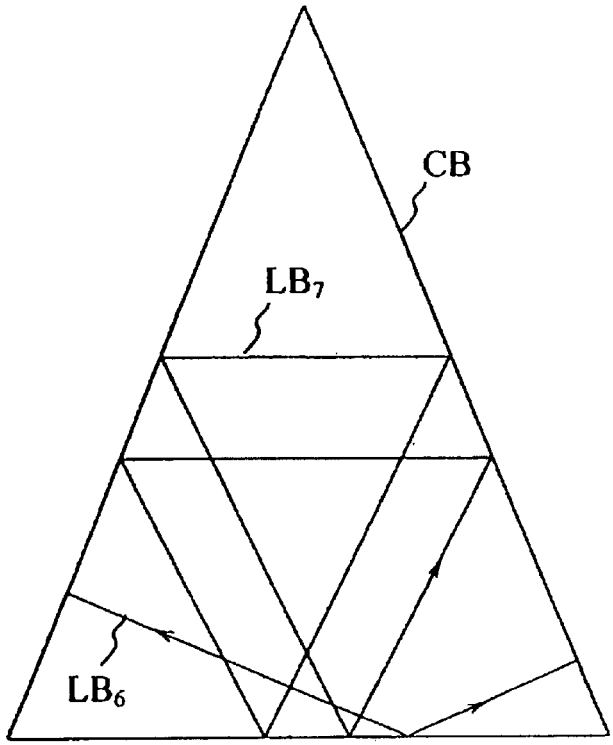
*Fig. 4 (Prior Art)*
*(Amended)*

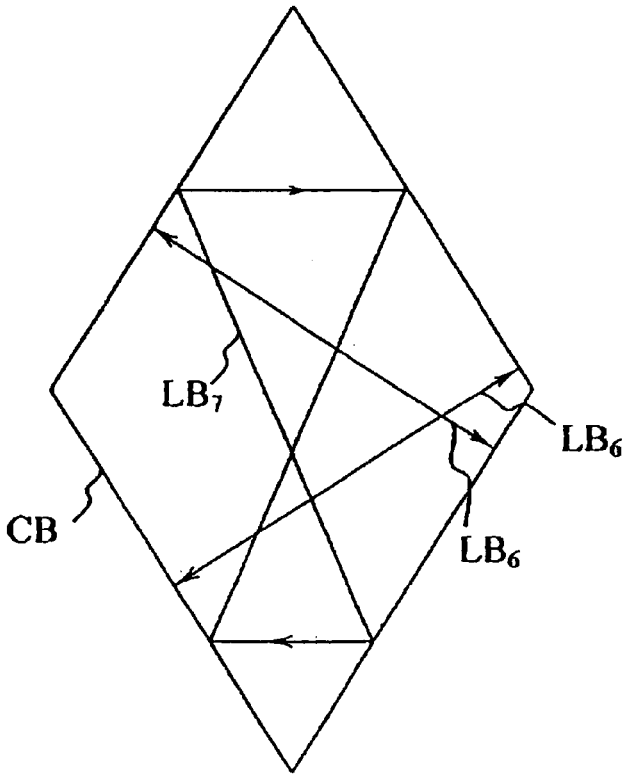
*Fig. 5 (Prior Art)*
*(Amended)*

HIGH POWER HIGH EFFICIENCY CLADDING PUMPING FIBER LASER

Matter enclosed in heavy brackets [ ] appears in the original patent but forms no part of this reissue specification; matter printed in italics indicates the additions made by reissue.

BACKGROUND OF THE INVENTION

1. Technical Field

The present invention relates to cladding pumping fiber lasers, and in particular relates to the fiber cladding geometry structure and pumping laser coupling method for construction of high-efficiency and high-power fiber lasers.

2. Background Art

The development of diode pumped fiber lasers has been rather successful recently. The scaling of various physical effects has greatly benefited this development. Diode lasers can provide concentrated pumping energy and thus enhance the efficiency of fiber lasers. The long thin geometry of fiber also makes heat removal much easier than in bulk solid state lasers. In end-pumped fiber lasers, a large outer cladding is used in cladding pumping. Pump light, often piped through fibers from pump lasers, enters the outer core, where it is confined so that it passes through the inner core, exciting the laser species. Stimulated emission from the laser species remains in the inner core. By converting the low brightness beam from the pump diode bar into a tighter beam, pumping a fiber laser can multiply brightness by a factor of more than 1000. By using such configuration, Polaroid, for example, reported a diode cladding pumping fiber laser reaching 35 W (M. Muedel et al CLEO '97, Postdeadline Paper CPD30, Baltimore, Md., 1997).

Currently, a typical fiber laser device includes a tens-of-meters double clad silica fiber with a small diameter and small NA core doped with active species, centered within a much larger inner cladding, surrounded by a soft low index fluoropolymer providing an acceptance NA of 0.45 for pump radiation. Pumping laser beams from laser diodes are coupled into the fiber inner cladding through the dichroic end mirror. (HR laser, HT pump). Among other things, the cladding pumping geometry and the coupling efficiency of pumping laser diode array are the main factors under intense research. Proper geometry is essential for increasing the efficiency of cladding pumping. Good method of coupling will allow more power to be injected into the fiber laser, which in turn also increase the efficiency of a fiber laser.

There are many patents dealing with cladding pumping. U.S. Pat. Nos. 5,533,163, 4,829,529, 4,815,079 disclose various cladding cross-sectional geometric shapes such as circle, rectangle, convex polygon (triangle, rhombus, hexagon). These cladding boundary (CB) shapes, however, have certain obvious disadvantages. The main disadvantage is the presence of local modes, and the pumping beam localized in such modes can not enter the core.

When skew ray is reflected on an arbitrary cylindrical surface, the projection of incident ray and reflected ray on the principle cross section are like the light ray reflected in this plane. Therefore, we can use the behavior of light beams in the principal cross section of cylindrical surface to determine local modes of fiber cladding.

The boundary shapes of fiber cladding geometry include circular, rectangle, right triangle, isosceles triangle, and rhombus. As a comparison with the current invention, the local modes in fiber cladding with different boundary shape are summarized as follows.

FIG. 1 shows a schematic illustration of a light beam path in prior art circular fiber cladding with a circular cladding boundary CB. Because the sag of ray keeps constant in multiple reflection, the light beams $LB_0$ initial at the outer region can not reach central region through multiple reflection. Therefore, the center position is not a good location for core A, and the core must be close to the boundary as position B although center position is usually more preferred due to the structures of fiber connections. FIG. 2 is a schematic illustration showing the local modes in prior art rectangular fiber cladding with a boundary CB. There are two types of local modes in the rectangular cladding. One is the light beam perpendicular to the boundary ($LB_1$, and $LB_2$), the other one is the light beam parallel to the line joining two corners ($LB_3$). These light beams form different close cyclic loops in the rectangular boundary. Besides these two fiber cladding geometry shapes, there are also right triangle, isosceles triangle and rhombus. For right triangle case, the light beams perpendicular to the hypotenuse form different close loops in the right triangle boundary as shown in FIG. 3 ($LB_4$ and $LB_5$). In isosceles triangle fiber cladding, there are two types of local modes as shown in FIG. 4. One is the light beam perpendicular to the leg ($LB_6$), the other type is the light beam parallel to the base ($LB_7$). Rhombus cladding behaves like two isosceles triangles. The local modes in rhombus cladding are the same as in isosceles triangle as shown in FIG. 5.

If a fiber cladding has some local modes and the core is not in the region of the local modes, the pumping light beam of local modes can not reach core and the pumping efficiency will decline.

In order to avoid the presence of local modes, sometimes bending in the fiber structure is suggested to provide perturbation in the modes propagating in the multi-mode cladding. However, the effect of bending on perturbation is not clear, and can not be accurately predicted. It will be much more favorable to find new cladding geometry structures so that local modes can not be generated, or at least the local modes are limited near the core area and the pumping beam can easily enter the core. In this way, the efficiency can be increased and the length of fiber lasers can be reduced.

Currently, the leading company in fiber laser research and manufacturing is Polaroid. One fiber laser of Polaroid was reported to have high efficiency (about 65%), but this efficiency is the ratio of pumping laser power entered the optical fiber and the output power of the fiber laser. Therefore, the efficiency of coupling or power injection is not considered. In this Polaroid fiber laser, three fiber-coupled SDL P6 diodes are spatially combined and de-magnified into a rectangular cladding. The slop efficiency of the diode lasers is only 0.5 W/A, while the efficiency of a non-fiber coupled diode laser is much higher, 1.25 W/A. Therefore the total electric efficiency of this Polaroid fiber laser is not high. In addition, due to the limitation of the cladding geometry, tens of meters of fiber must be used in this state-of-the-art system. Furthermore, since it is difficult to couple more beams into an optical fiber with the coupling method used in the Polaroid systems, it is difficult to develop a fiber laser with even higher power, such as 1000 W CW. It is therefore necessary to find new methods to couple high power into optical fibers and improve the pumping efficiency.

A typical high-power laser diode array (LDA) has an a broad area light emitting aperture (1 cm×1 μm) comprising light emitting elements which are multiple spaced apart segments. In one typical commercial LDA product, for example, each segment has a width less than 200 μm, and may be divided into 20 sub-segments. Each sub-segment has an aperture width of 3–6 μm, and emits about 30 mW–60 mW. The effective aperture size in the transverse direction perpendicular to the plane of laser active region (the fast axis) is about 1 μm. Typical fast axis divergence is 30–40 degree and slow axis divergence is 10–15 degree. A typical high-power LDA can deliver 20 W of laser power. Those more powerful can deliver 40 W or 60 W with this geometry. Because of the broad geometry of LDA, it has been always a challenge to couple or inject high power (such as 4000W) into a fiber cladding aperture (such as an aperture of 200 μm×500 μm, NA 0.45).

In order to send more power into a cladding fiber, many efforts have been made to concentrate light from diode laser arrays. There are a number of patents dealing with concentrating multiple emitter laser diode beams, such as U.S. Pat. Nos. 5,802,092, 5,793,783, 5,790,310, 5,594,752, 5,579,422, 5,568,577, 5,333,077, 5,185,758, 5,139,609, and 4,428,647.

In U.S. Pat. No. 4,428,647, Spragne et al disclose systems in which each laser emitter of a diode laser array has its own lens mount adjacent to it in the space between the laser array and objective lens of the system. The purpose of the lens array is to change the angle of divergence of light beams leaving the emitting surface of the laser array at the slow axis so that the light beam can be collected efficiently by the objective lens. In U.S. Pat. No. 5,185,758 and in an earlier article (Optical Letters, Vol. 14, p.1087, 1989) Fan et al describe a method for scaling a pumped medium to higher power with multiple light source. The output beam of each light source is substantially collimated by respective collimating optics, and the beams of sources are substantially parallel to each other after collimation. An optical system is provided to focus the collimated and parallel beams. The methods described in U.S. Pat. No. 5,802,092, 5,793,783, 5,790,310, 5,594,752, 5,579,422, 5,568,577, 5,333,077, and 5,139,609 are similar to the methods mentioned above. However, since lens arrays can only collimate the beam from the diode array to a limited extent, obvious divergence still exists. Because of the beam divergence, laser diode arrays must be close to an optical fiber so that the beam spot is small enough to achieve effective coupling. When multiple laser diode arrays are combined, the dimension of beam spot on the fiber aperture plane becomes larger due to the increased distance between laser diode arrays and the fiber aperture. As a result, these methods can not efficiently combine the beams from a plurality of diode laser arrays in to an optical fiber. For example, with these methods, it is impossible to effectively couple the beams from 200 pieces of 20W diode laser bars into a fiber to make a high-power fiber laser.

A need therefore exists in the art for a method to make high-efficiency, high-power fiber lasers, while high-efficiency cladding pumping geometry and effective LDA-fiber coupling are the most desired.

SUMMARY OF THE INVENTION

Accordingly, it is the principal object of the present invention to provide a high-efficiency, high-power cladding pumping fiber laser.

It is also an object of the present invention to provide a method and apparatus with which a laser beam from a laser diode array with collimating structures can be transmitted for a long distance while the beam spot dimension can be kept substantially unchanged even if the beam from said array is not substantially collimated.

It is another object of the present invention to provide brightness conserved optical pumping systems.

It is another object of the present invention to teach methods of coupling high laser power coupling into an optical fiber with high efficiency, such as a method of injecting at least 4000W power into 0.5–0.2 $mm^2$cladding and generating fiber laser output of 2500W.

It is another object of the present invention to provide novel cladding geometry so that the length of laser fibers can be reduced.

It is still another object of the present invention to provide a fiber laser with claddings that can avoid or minimize local modes.

To achieve the foregoing and other objects, and in accordance with the purposes of the present invention, as embodied and broadly described herein, a preferred apparatus of this invention may comprise a fiber laser core doped with active species, a symmetry-broken inner cladding or a multiple-imaging inner cladding surrounding said core, a plurality of brightness substantially-conserved laser diode array modules, and a brightness substantially-conserved optical system for coupling the beam from said laser diode array module into said inner cladding.

Additional objects, new features and advantages of the present invention will be set forth in part in the following description. Further scope of applicability of the present invention will become apparent from the detail description of the invention provided hereinafter. It should be understood, however, that the detailed description of the invention and the specific examples presented, while indicating preferred embodiment of present invention, are provided for illustration purposes only, because various changes and modifications within the scope and spirit of the present invention will become apparent to those of ordinary skill in the art from the detail description of the invention that follows.

BRIEF DESCRIPTION OF THE DRAWINGS

The accompanying drawings serve to explain the principles of the invention, in which:

FIG. 1 shows a schematic illustration of light beam path in prior art circular fiber cladding with a circular cladding boundary.

FIG. 2 is a schematic illustration showing the local modes in prior art rectangular fiber cladding.

FIG. 3 is a schematic drawing showing the local modes formed in cladding with right triangle boundary.

FIG. 4 is a schematic drawing showing the local modes formed in cladding with isosceles triangle boundary.

FIG. 5 is a schematic diagram showing the local modes formed in cladding with rhombus boundary.

DETAILED DESCRIPTION OF THE INVENTION

In the present invention, the methods and apparatus for making efficient cladding pumping fiber lasers are disclosed. In particular, new fiber cladding geometry structures and new method of coupling pumping laser beam into an optical fiber are disclosed. Both aspects of the present invention will facilitate the realization of high-efficiency and high-power fiber lasers. In the present invention, cladding boundary geometry structures that can prevent the formation of local modes are disclosed. The new cladding shapes can be made into large dimension if desired. Besides the cladding geometry, methods and apparatus for efficient coupling of diode lasers into a laser fiber for high power injection are also disclosed. Essentially, the new methods make it possible to transmit diode laser beams for a long distance with substantially the same brightness. In other words, with the methods and apparatus disclosed, a laser beam from a laser diode array with collimating structures can be transmitted for a long distance while the beam spot dimension can be kept substantially unchanged even if the beam from said array is not substantially collimated. With the method taught in the present invention, laser diode array modules can be formed with laser diode arrays (LDA) with collimating structures and relay systems. Because of the brightness conservation nature of the modules, when a plurality of such modules (such as 3, 9, or more than 200 pieces) are combined, the beams from the arrays can be efficiently coupled into an optical fiber. Thus the pumping laser coupling method can be used for the construction of high-efficiency and high-power fiber lasers. Thus, the fiber lasers of this invention may comprise a fiber laser core doped with active species, a symmetry-broken inner cladding or a multiple-imaging inner cladding surrounding said core, a plurality of brightness substantially-conserved laser diode array module for coupling the beam from said laser diode array module into said inner cladding.

1. Fiber Cladding Geometry for Fiber Lasers

From the previous discussion of prior art, it can be seen that the boundary symmetry benefits the generation of local modes. Therefore, a favorite boundary for fiber cladding should be a symmetry-broken boundary, and it is easy to break the symmetry of boundary with appropriate boundary perturbation.

Some examples of possible cladding geometry structures are discussed below. With this principle, it is apparent to the skilled in the art that any inner cladding geometry structure with a symmetry-broken shape can be used to reduce or eliminate the formation of local modes, and this in turn will increase the efficiency of cladding fiber lasers.

(a). Symmetry-broken circular cladding

Figure 6:
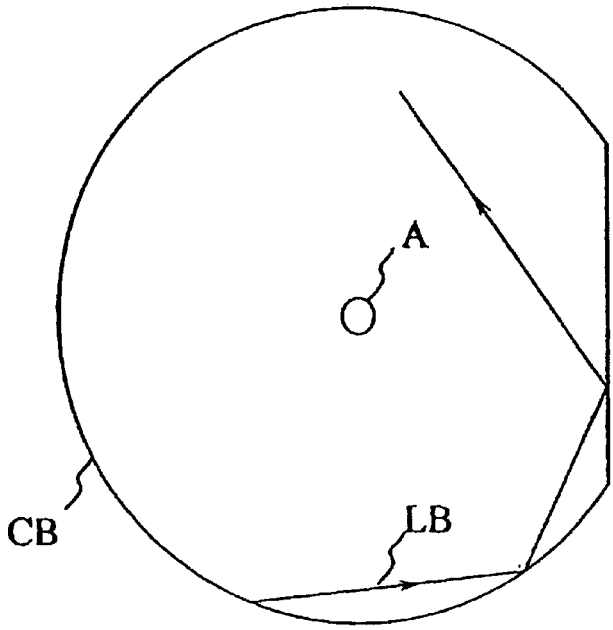
FIG. 6 is a schematic drawing showing the cross-section of a symmetry-broken circular cladding wherein a plane mirror boundary is added to break the circular symmetry.
Figure 7:
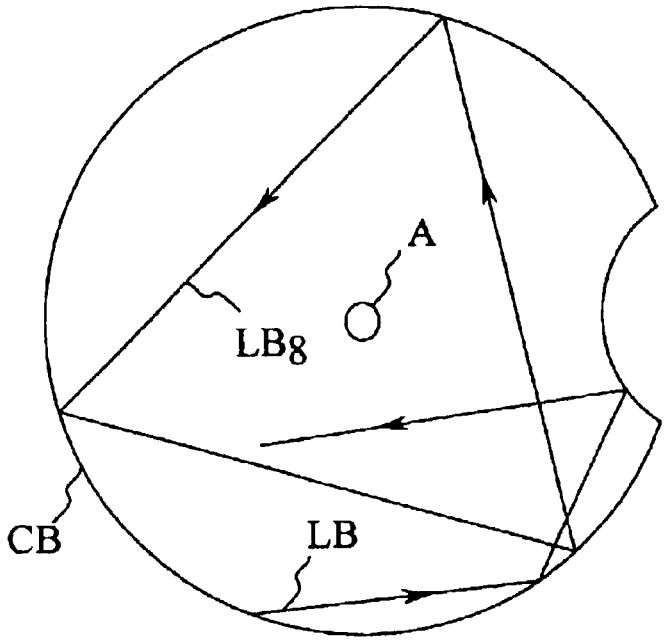
FIG. 7 is a schematic drawing showing the cross-section of a symmetry-broken circular cladding wherein a convex mirror boundary is added to break the circular symmetry.
Figure 8:
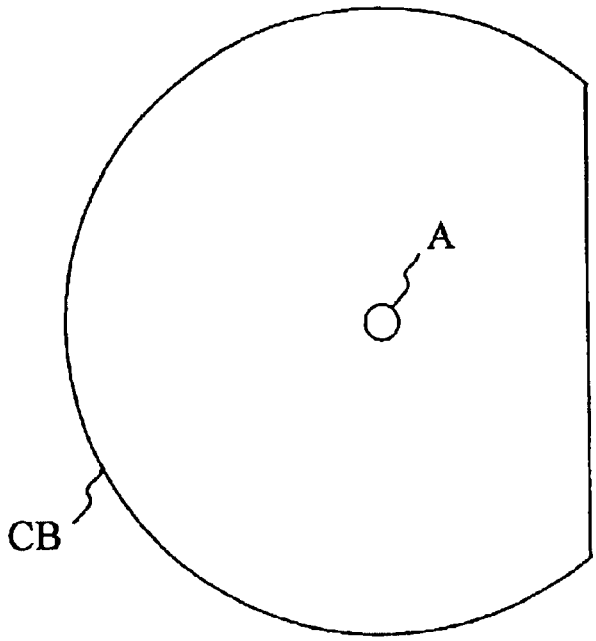
FIG. 8 is a schematic drawing showing a cross-section of a symmetry-broken circular cladding with a plane mirror boundary, wherein the dimension of the mirror is larger than that in FIG. 6.
Figure 9:
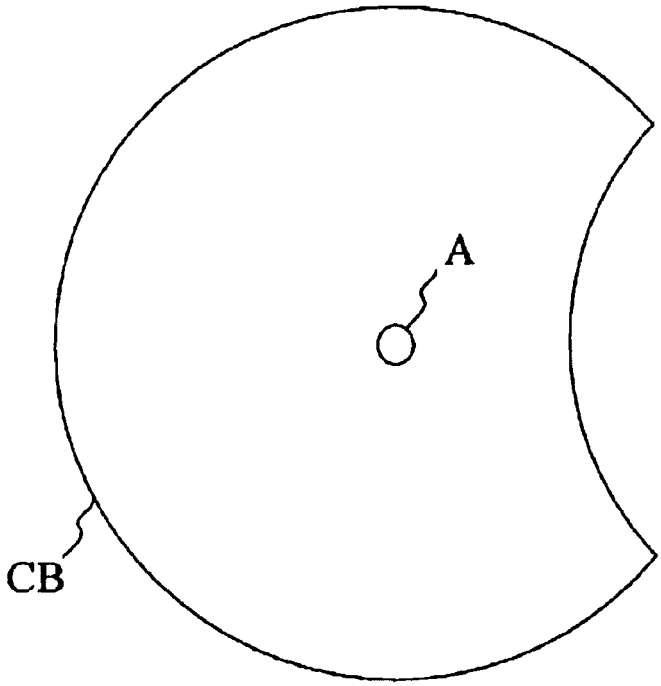
FIG. 9 is a schematic drawing showing the cross-section of a symmetry-broken circular cladding with a convex mirror boundary, wherein the dimension of the mirror is larger than that in FIG. 7.

It is easy to break the symmetry of circular cylinder cladding. Examples are shown in FIG. 6 and 8, by using a plane mirror, or in FIG. 7 and 9, by using a convex cylindrical mirror. Because of the abrupt change in the direction of surface normal, all of whispering modes near boundary may be destroyed. But some of the integral reflection loops may still exist. FIG. 7 shows a three-reflection-loop $LB_8$. A larger cut of as shown in FIG. 8 and 9 can destroy these loops. By bending the fiber, the integral reflection loop can also be destroyed. In these cases, the fiber core A can be positioned at the center of the cladding if desired.

(b) Symmetry-broken rectangular cladding

Figure 10:
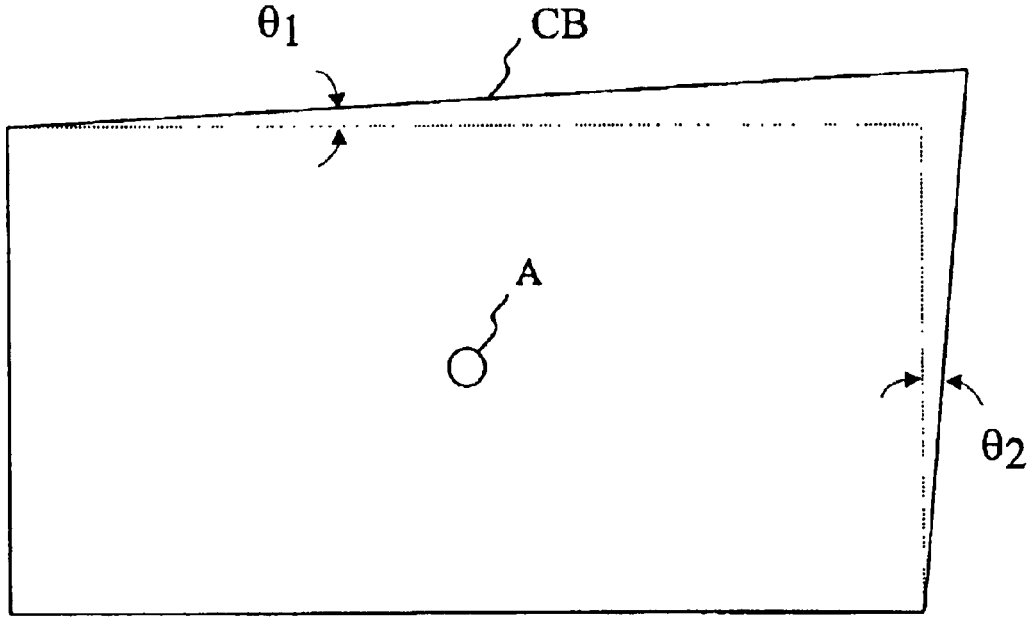
FIG. 10 is a schematic drawing showing a symmetry-broken rectangle-like boundary, wherein the presence of small angles makes the surface no longer parallel.
Figure 11:
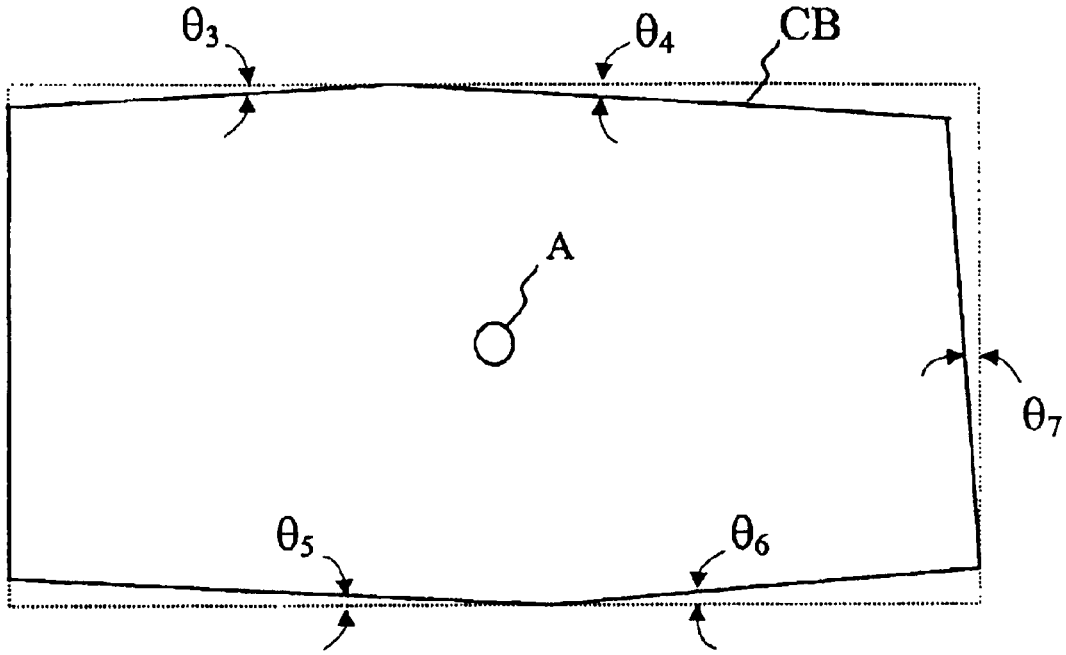
FIG. 11 is a schematic drawing showing a different symmetry-broken rectangle-like boundary, wherein the presence of small angles makes the surface no longer parallel.

FIG. 10 and FIG. 11 show two cases of rectangle-like boundaries. The presence of small angles (θ1, θ2, θ3, θ4, 05, θ6, θ7) between the boundaries and the sides of a true rectangle (shown in dot line) makes the surfaces no longer parallel to each other. In these configurations, the core A also can be located near the center.

Because of the area (volume) of core is much smaller than cladding, pumping beams in cladding must reflect multiple times before passing through the core. If the number of reflection is very large, the fiber laser must be very long. The number of reflection may be larger than the ratio of the dimension of cladding to core. One solution is to use multiple-imaging claddings. It will then be possible to provide numbers of reflection substantially equal to the ratio between the cladding dimension and core dimension.

(c) Multiple-imaging cladding

Figure 12:
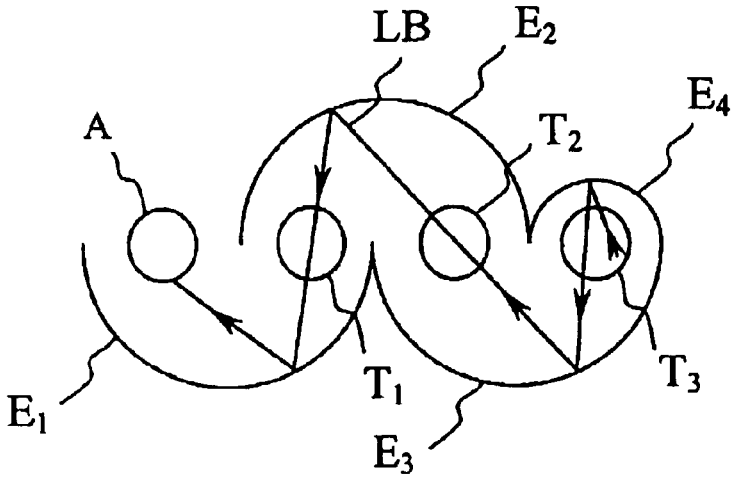
FIG. 12 is a schematic drawing showing a multiple-imaging cladding for cladding pumping.
Figure 13:
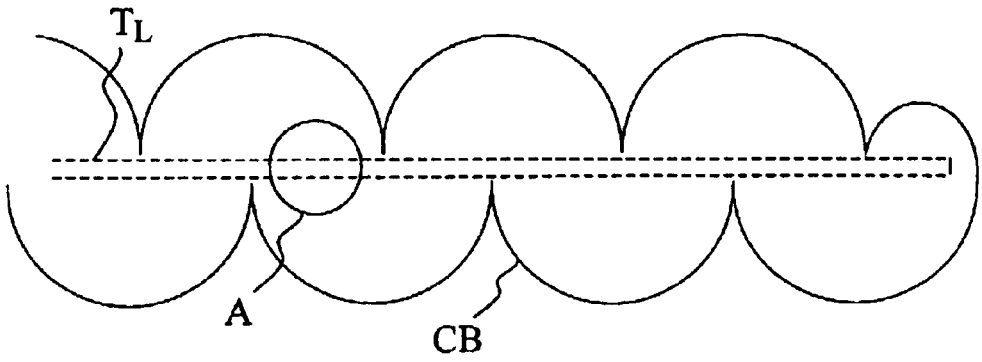
FIG. 13 is a schematic illustration showing a long light source TL passing through the core by multiple-imaging cladding.

FIGS. 12 and 13 show multiple-imaging cladding for claddings pumping. It is the configurations that pile up multiple light source images at the core. In FIG. 12, light source T1 forms an image at the core A by mirror E1, light source T2 forms an image at T1 by mirror E2, light source T3 form an image at T2 by mirror E3, and so on. The another half of light beam LB from T3 will be reflected back by mirror E4, and will enter the core through multiple reflection by mirrors E3, E2, and E1. The mirror surfaces of E1, E2 and E3 may be circular cylinders or elliptical cylinders. It can be seen that with the increase of light sources, the number of reflection will be increased in proportion with the increase of the cladding dimension. This method will allow the arbitrary increase of cladding dimension. Essentially, all of the light beams in the cladding will enter the small core through multiple imaging.

FIG. 13 shows a case of a long light source $T_L$ passing through the core by multiple-imaging cladding. Note that the light source and the cladding mirror are extended to the other direction of the core, so the core is at the center of the cladding in this example. But the core does not have to be at the center to achieve the same results.

(d) Rectangular-like multiple-imaging cladding

Rectangular-like cladding described earlier can be modified to be a multiple-imaging cladding—rectangular-like multiple-imaging cladding.

Figure 14:
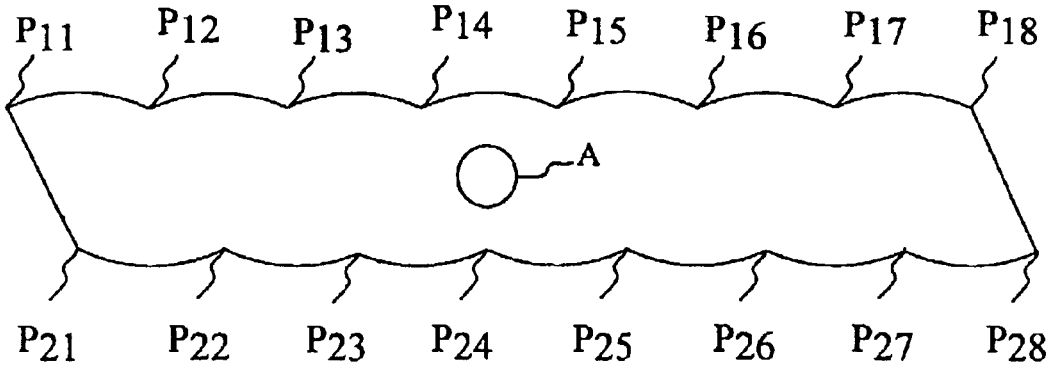
FIG. 14 is a schematic illustration showing the cross-section of a rectangular-like multiple-imaging cladding, wherein two straight sides of the rectangular-like shape in this cross-section are replaced with multiple arcs.

Referring to FIG. 14, there shows a schematic illustration of the cross-section of a rectangular-like multiple-imaging cladding. The two straight sides of the rectangular-like shape in this cross-section are replaced with multiple arcs.

In this type cladding, it is preferred that arcs are circular-like, and the centers of the circular arcs are on the opposite side of the cladding as shown in FIG. 14. Thus the center of arc P21–P22 is P12, the center of P11–P12 is P21 and so on. Therefore, P11–P12 is the image of P12–P13, P13–P14, P14–P15, P15–P16, P16–P17, and P17–P18 by multiple reflection.

2. Lagrange Invariant of Laser Diode Arrays

It is well known that Lagrange invariant of an imaging optical system is the product of the imaging beam solid angle and the image spot area. The invariant keeps constant from the radiation source to the optical system and then to the image plane. Therefore, the brightness of light beam also keeps constant throughout imaging process. A well-designed imaging optical system is usually a brightness-conserved system.

Optical system for illumination may or may not be brightness-conserved depending upon the system design. This can be seen in some specifications of some 20 W diode laser arrays. For example, one commercial product has an emitter area of 1 cm×1 μm and divergence angle of 10°×40°. The brightness is therefore 16 kW/(mm.rad)$^2$. Another fiber-coupled diode laser array starts with also a 20 W laser diode array have a fiber output of 16W. This fiber-coupled diode laser array with a fiber core diameter of 0.6 mm and NA 0.37 only has a brightness of 130 W/(mm.rad)$^2$. It can be seen that the design of the optical system for illumination must be very careful for coupling a diode laser beam into a fiber, otherwise high-power diode laser beam can not be efficiently coupled into a fiber laser cladding due to the declination of beam brightness.

Therefore, it is preferred to use high brightness LDA combining with brightness conservation optical system for illuminating the fiber laser cladding. This will allow the injection of the highest power into a fiber cladding of a given dimension.

LDA's with collimating structures (LDAC's) can have very different Lagrange invariant and therefore have very different brightness depending on the collimating structures used. When the power of an LDA is determined, it is preferred that the Lagrange invariant of LDAC is as small as possible so that more power can be injected into a small area. Some laser diode arrays with collimating structures are shown below along with their Lagrange invariant. As examples, a 20 W laser diode array is used in all these examples.

Figure 15:
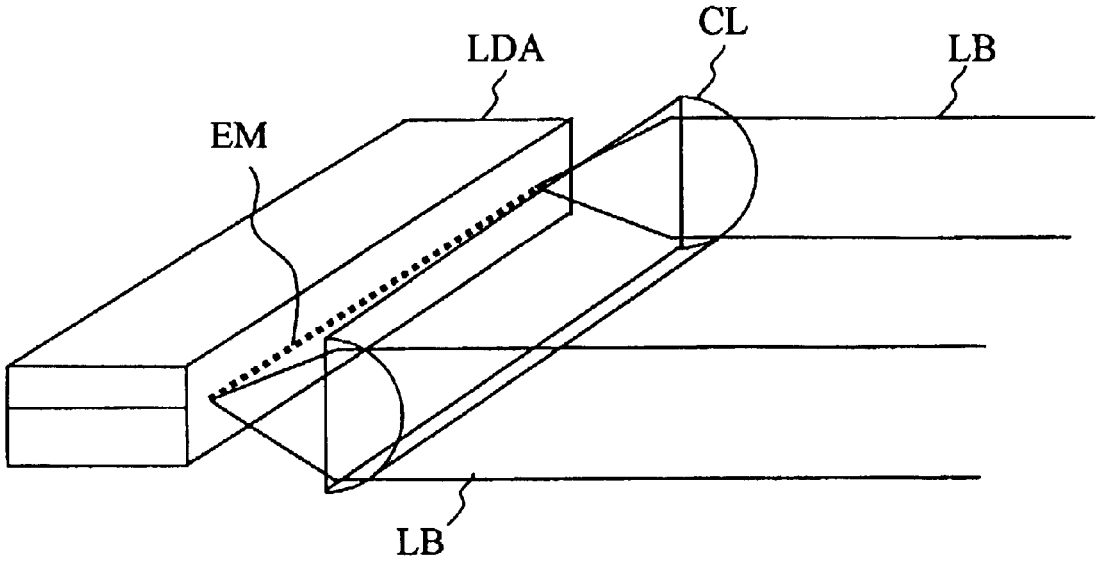
FIG. 15 shows an illustration of LDAC1 in which a cylindrical lens CL is placed in front of the laser bar so that the beam LB at the fast axis is collimated.
Figure 15:
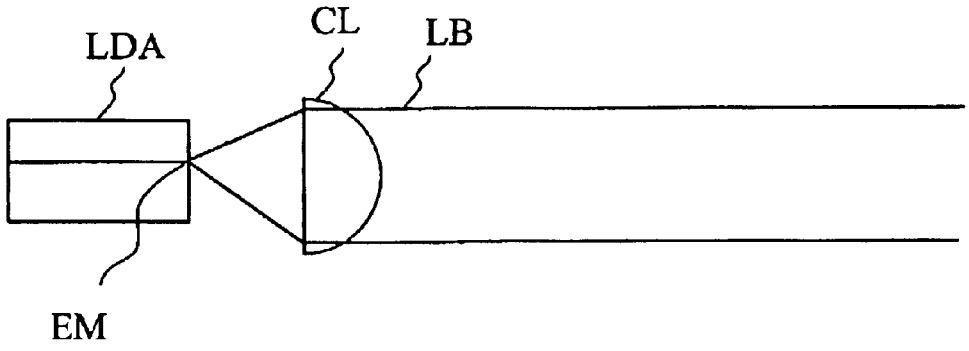

(a) LDAC1 has a laser bar with multiple emitters EM. The light emitting aperture is 1 m×1 μm and the divergence angle is 10°×40°. The Lagrange invariant of LDAC1 is 1.7×0.00073 (mm.rad). FIG. 15 shows an illustration of LDAC1 in which a cylindrical lens CL is placed in front of the laser bar so that the beam LB at the fast axis is collimated. If the focal length of CL is 1 mm, the aperture of CL is 0.73 mm. If the cylindrical lens forms the image of the emitter aperture of 1 μm at a distance of 730 mm, the image height is also 0.73 mm. The laser beam leaves CL with an aperture of 1 cm×0.73 mm and a divergence angle of 10°0.001 rad, and has an unchanged Lagrange invariant.

Figure 16:
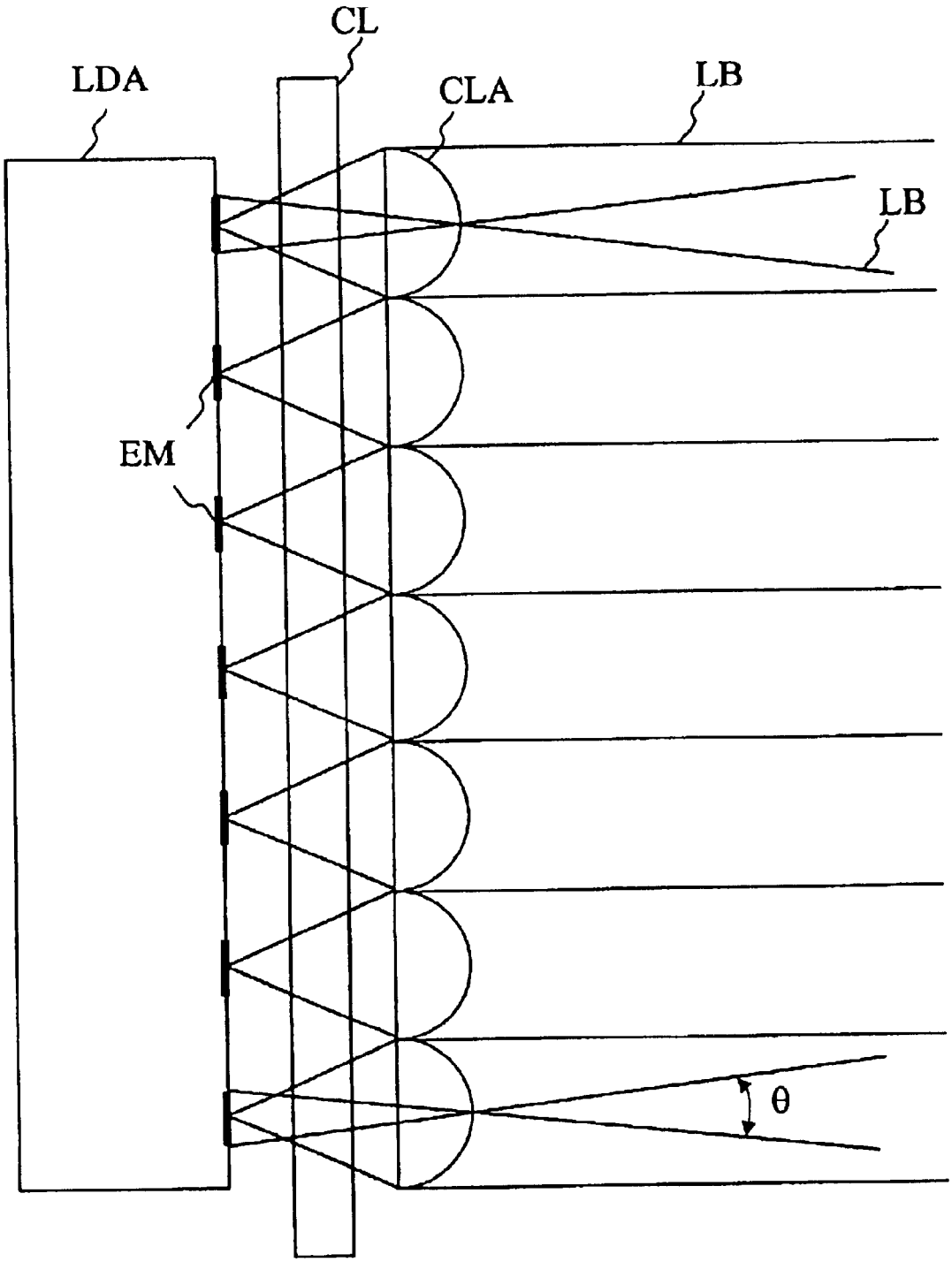
FIG. 16 is a schematic illustration of LDAC2, wherein, besides a cylindrical lens CL like in FIG. 15, a cylindrical lens array (CLA) is disposed.

(b) LDAC2 has the same light emitting aperture and divergence angle as in LDAC1, but each emitter EM in this case is divided into 20 separate segments spaced apart. The width of each segment is 200 μm×1 m. Beam filling and collimating optics are used so that the brightness of the individual segment is conserved. As shown in FIG. 16, besides a cylindrical lens CL like in FIG. 15, a cylindrical lens array (CLA) is disposed in front of the emitter segments. In contrast with LDAC1, the Lagrange invariant of LDAC2 is 0.68–0.00073 (mm.rad)$^2$.

(c) LDAC3 is similar as LDAC2, but the segment width is changed from 200 μm to 150 μm. The Lagrange invariant of the LDA is 0.46×0.00073 (mm.rad)$^2$. With a structure just like that in FIG. 16, the beams are collimated. A fill factor of 1 can be achieved, filling the aperture and minimizing divergence angle θ. After CL and CLA, the beam from LDAC3 has an aperture of 10×0.73 mm$^2$ and a divergence angle of 0.05×0.001 rad$^2$, and the Lagrange invariant is unchanged.

(d) LDAC4 is a laser diode array with both fast axis and slow axis collimators. In has no emitting aperture 1 cm×0.8 mm and a divergence angle of 5°×3 mrad. The Lagrange invariant of LDAC4 is 0.87×0.0024 (mm.rad)$^2$.

Figure 17A:
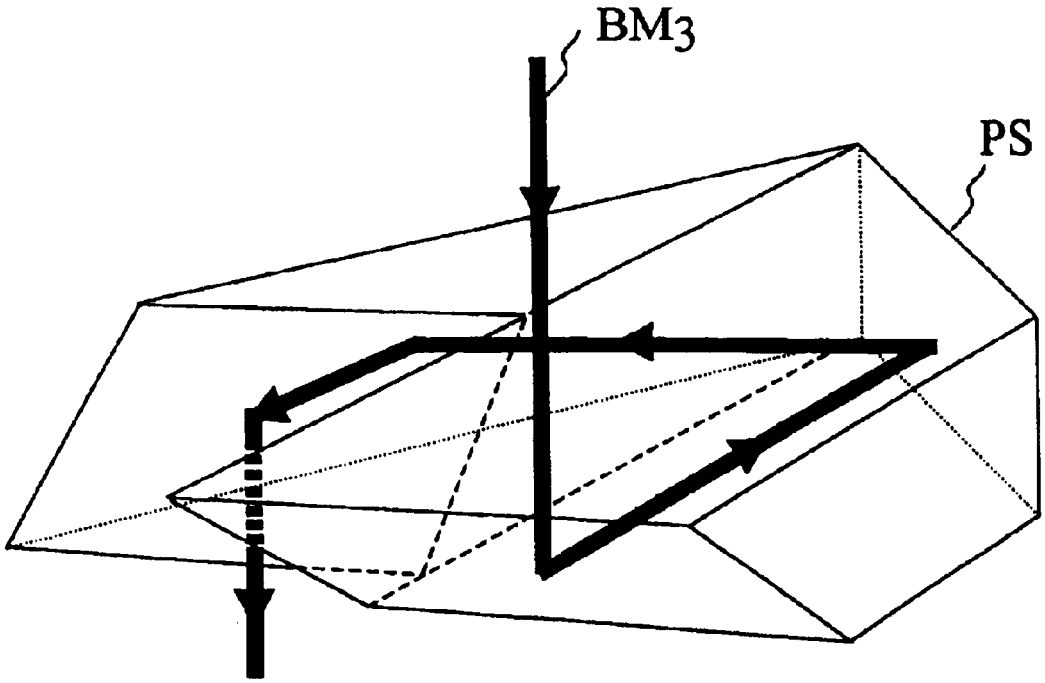
FIG. 17(a) is a schematic illustration of a fold prism PS along with the beam path.
Figure 17B:
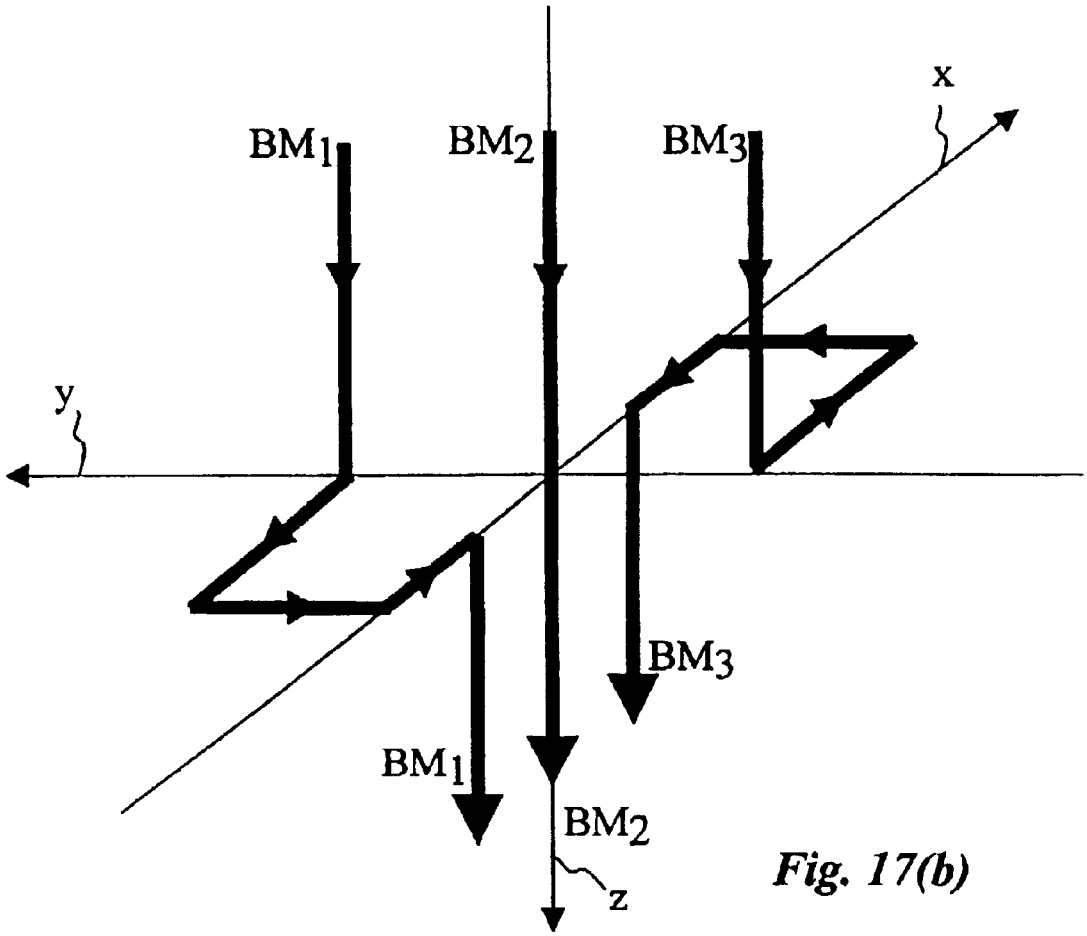
FIG. 17(b) shows how the three laser beams BM1, BM2, and BM3 are aligned by fold prisms wherein BM1 and BM3 after 4h reflection become the beams with the same y coordinate and different x coordinate, and the beams are piled up as shown in FIG. 17(c).
Figure 17C:
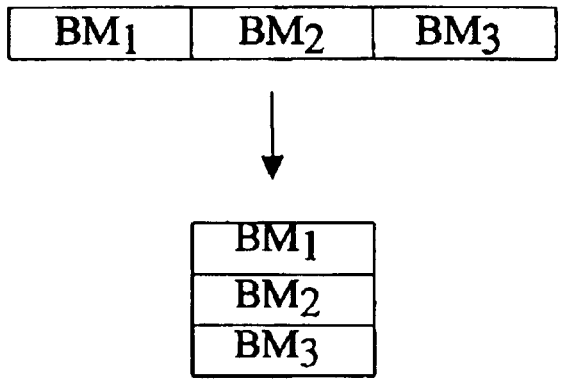

(e) LDAC5 is similar as LDAC1 but with two fold prisms. The prisms align the laser beams and change Lagrange invariant of LDAC1 to 0.57×0.0022 (mm.rad)$^2$. FIG. 17(a) shows the schematic illustration of the fold prism PS along with the beam path. The beam transmission direction is changed due to the reflection in the fold prism. FIG. 17(b) shows how the three laser beams BM1, BM2, and BM3 are aligned. These beams have the same x coordinate, but different y coordinate and the beams propagate in the z direction. BM1 and BM3 after $4^{th}$ reflection become the beams with the same y coordinate and different x coordinate, and the beams are re-aligned and piled up as shown in FIG. 17(c).

(f) LDAC6 is the same as LDAC3 but with two fold prisms. Lagrange invariant of LDAC6 is 0.15×0.0022 (mm.rad)$^2$.

If the beams from these different devices are focused by an optics with NA 0.45, the spot dimensions are as the following: LDAC1: 1.9×0.0008 mm$^2$, LDAC2: 0.75×0.0008 mm$^2$, LDAC3: 0.5×0.0008 mm$^2$, LDAC4: 0.96×0.0026 mm$^2$, LDAC5: 0.63×0.0023 mm$^2$, LDAC6: 0.17×0.0023 mm$^2$. Because the spot dimension in one direction is very small, if we combine 200 pieces of the same LDAC's in this direction, the dimension will be multiplied by 200. The spot dimensions for these combined arrays will become 1.9×0.16, 0.75×0.16, 0.5×0.16, 0.96×0.54, 0.63×0.46, and 0.17×0.46 $mm^2$, respectively.

For a cladding pumping fiber laser, if the cladding dimension is larger than the spot dimension shown above, the pumping diode laser power will be able to be injected into the laser fiber efficiently. For the example with 200 pieces of LDAC's, this means 4000W of diode laser power can be injected into the laser fiber. The LDAC's with folded prisms, disclosed above in the present invention, apparently has advantages over others due to the small spot dimension. It should be noted, however, with the above structures, none of the LDAC's can have a well collimated beam output at the slow axis.

3. Laser Diode Array Module

By analyzing the problems encountered in making high-efficiency, high-power fiber laser, a conclusion can be made that laser diode arrays with collimating structures such as LDAC's discussed earlier can not provide a substantially collimated beam. The spot dimension of the beam always increases with the increase of distance between an LDAC and the aperture plane of an optical fiber, while the increase of this distance is unavoidable when a plurality of LDAC's are combined. Therefore, although the fiber cladding can be highly efficient in allowing the pumping power to enter the fiber core of a fiber laser, the limit in coupling pumping laser beam into the fiber cladding still limits the total efficiency of a fiber laser. As a result, thus far there has not been a method to achieve a fiber laser with a high output power over, for example.

We discovered that the high efficiency of coupling laser into optical fiber can be achieved by using a laser diode array module. A laser diode array module is a system comprising at least one laser diode array with collimating structures (LDAC's) and at least one optical relay system. An optical relay system is an optical system well defined in the art, with which the collimated or even a partially collimated beam from LDAC can be relayed to a more distant point. With the laser diode array module, the beam from a LDAC can transmit for a long distance, while the beam spot dimension including divergence angle after the transmission can be kept substantially the same as they leave the LDAC. Therefore, with said module, brightness conservation can be substantially achieved. It is obvious that both the LDAC's discussed above and other laser diode arrays with collimated structures can be used in said module. The optical relay system comprises at least one optical component such as a lens. It is preferred that the optical relay system includes a cylindrical lens. It is more preferred that the optical relay system include a 4f cylindrical system. It is also more preferred that the optical relay system is telecentric both at the objective space and the image space. It is apparent to the skilled in the art that the relay can be placed in any place in the optical path within the module, and it can also be "mixed-in" with the collimating structures of LDAC's. The advantage of using laser diode array module will be obvious from the examples below.

Figure 18:
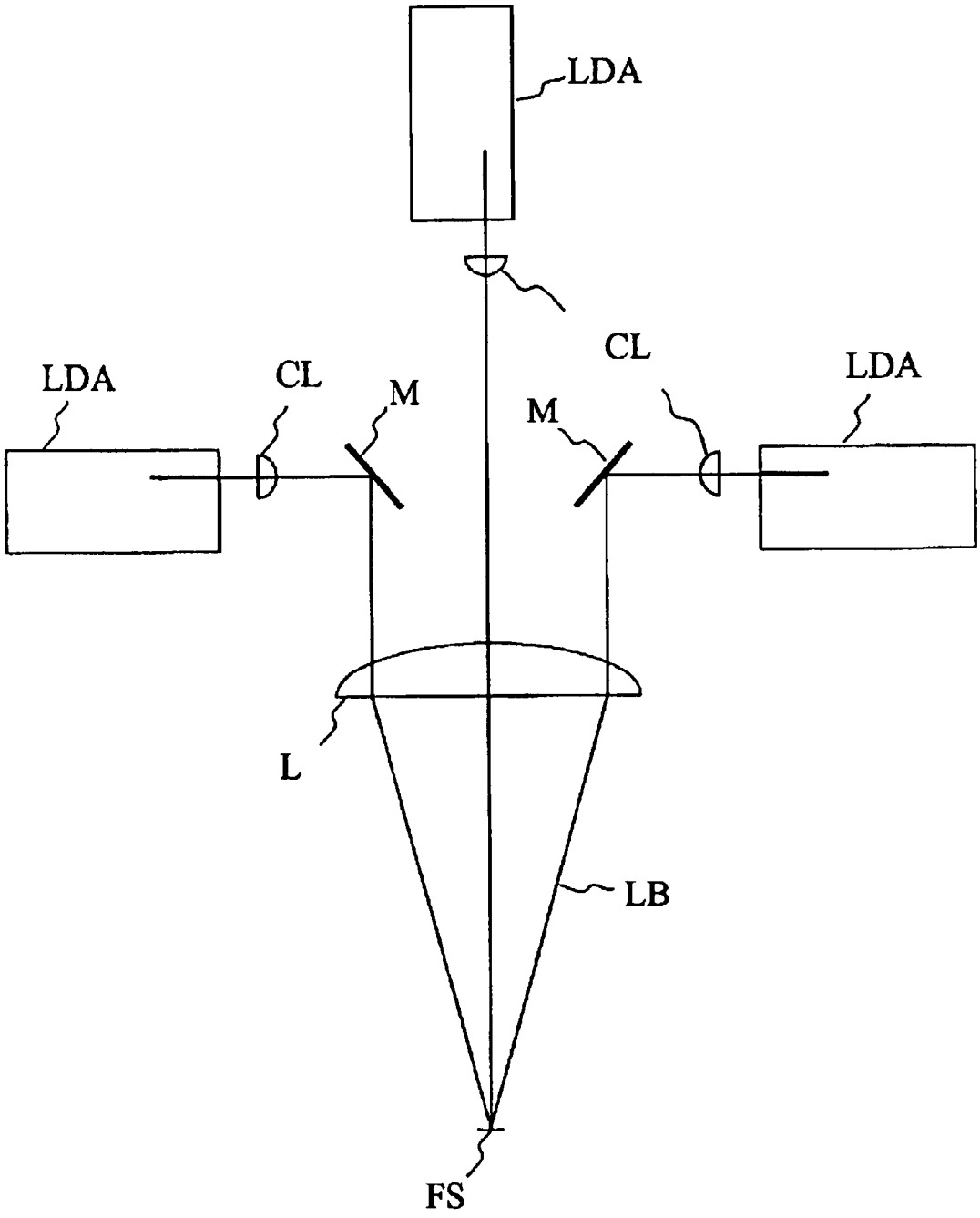
FIG. 18 is a schematic illustration for a combination of three LDAC's.

Referring to FIG. 18, there is shown in schematic illustration a combination of three LDAC's. In this example, each LDAC has a cylindrical lens CL for collimating beam LB from LDA. The beam from the LDAC is collimated at the fast axis with the beam being divergent at the slow axis. The three beams are made parallel with small mirrors M, and then focused by lens L to the common focal spot FS. If the aperture of a laser fiber coincides with FS, and the inner cladding dimension (including NA) is larger than the beam spot dimension, all of the laser beams can be injected (or coupled) into the laser fiber. Because the laser beams are divergent at the slow axis, the distance from LDAC's to L is made as short as possible so that the diameter of L can be small. If the NA of lens L is 0.45, the focal length of L will be equal to the LDAC beam dimension at the slow axis (for example, 10 mm for a typical commercial LDAC). If the LDAC's are like LDAC1, the focal spot dimension at the slow axis is 1.7 mm. If the LDAC's are like LDAC4, the dimension is 0.85. If the LDAC's have two folded prisms as in LDAC5 and LDAC6, the laser beam dimension at the slow axis and the focal length of L is 3.3 mm, and focal spot dimension will decrease to 0.56 and 0.28 mm, respectively. Because of the beam divergence at the fast axis is very small (typically 1 mrad), another dimension of focal spot is less than 0.01 mm. In this case, the distance between LDAC and L can be small and relay system is less important. But, with three LDAC's, only low power can be achieved.

Figure 19:
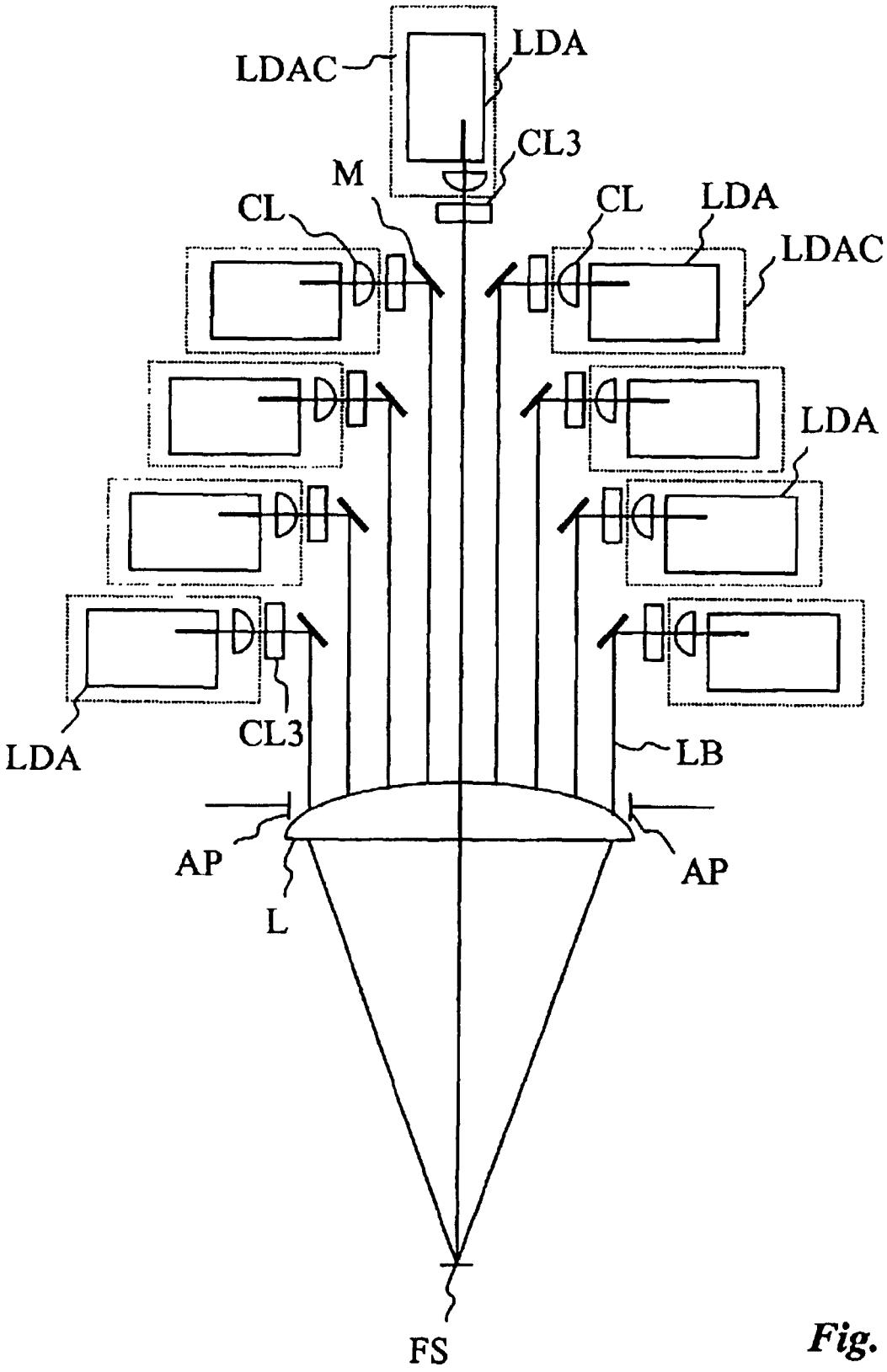
FIG. 19 is a schematic illustration for a combination of nine LDAC's.
Figure 20A:
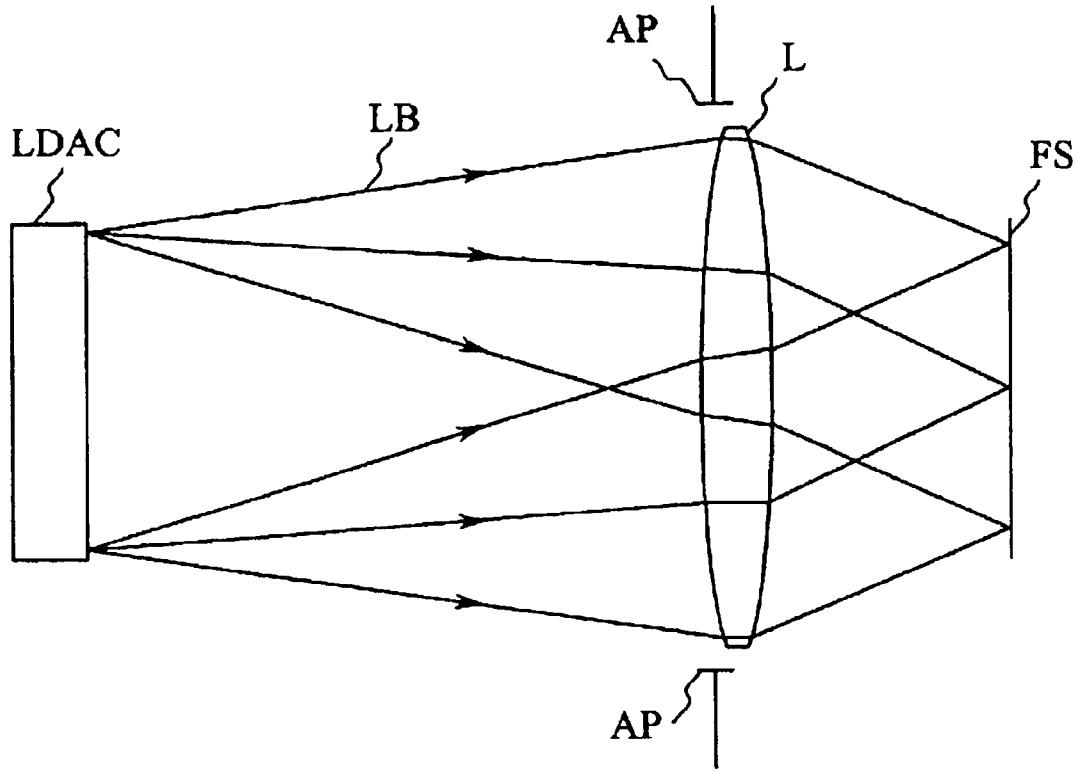
FIG. 20(a) is a schematic illustration showing that without a relay, much larger dimension of the beams at the slow axis will be obtained.
Figure 20B:
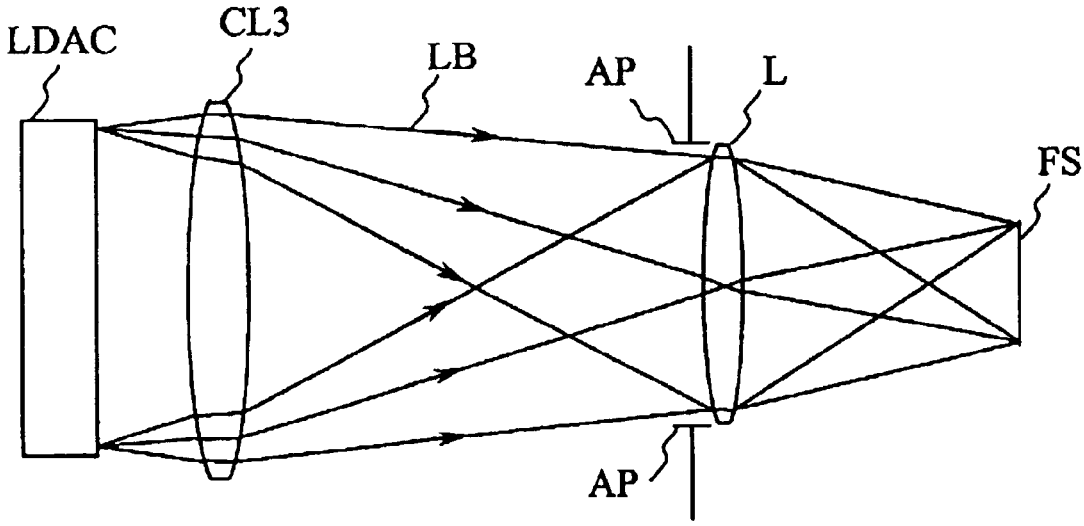
FIG. 20(b) is a schematic illustration showing the improvement achieved with a relay system.

Referring to FIG. 19, there is shown in schematic illustration a combination of nine laser diode array modules. Each LDAC is collimated in the fast axis. When there is no relay system, after the reflection from the small mirrors M, the nine parallel laser beams are focused by lens L to a common focal spot FS. If the beam aperture at the fast axis is 0.8 mm, the combined beam aperture at AP will be 7.2 mm. Since the distance d from LDAC to L can not be made small and may be even larger than 50 mm, this will cause a too large dimension of the beams at the slow axis as shown in FIG. 20(a). It is necessary therefore to use a relay cylindrical lens CL3 with an LDAC to form a laser diode array module as shown in FIG. 20(b). In this module, it is preferred that CL3 is substantially close to the LDAC, and the focal length is substantially equal to distance to aperture AP. If the NA at FS is 0.45, the spot dimension at slow axis is the same as the previous 3-LDA case, the spot dimension at the fast axis will be slightly larger than 0.01 but still very small.

Because the beam dimension at the fast axis and at the slow axis are different at the position AP, and because the position of the "object" is also different, lens L can be replaced with two cylindrical lenses having different focal lengths at different positions. However, in some special designs, single spherical lens still can be used as L. In addition, although NA of a beam at FS is limited as 0.45, the angle between the beam and the FS plane could exceed the value determined by NA since optical path is not telecentric. This is shown in FIG. 20(b). In other words, telecentric relay is more preferred.

From the above two examples, it can be seen that in order to combine the beams from a plurality of LDAC's into a single aperture AP, the use of laser diode array modules is necessary to achieve small focal spot. With laser diode array modules, beams can transmit in long distance with substantially the same brightness and keep being telecentric. The advantages of laser diode array modules therefore are obvious.

Referring to FIG. 21, there is shown in schematic illustration an example of a laser diode array module used for multiple laser diode array pumping. In this example, the laser diode array has multiple emitters EM. The laser beams from the emitters EM are collimated by the cylindrical lens CL at the fast axis. In general, the laser beam at the fast axis is diffraction limited. The beam dimension can be kept the same for a very long distance (such as 800 mm within 0.8 mm), as schematically illustrated in FIG. 21(b) (side view). A cylindrical lens array CLA is also disposed in the front of the laser diode array. Each micro-cylindrical lens of CLA collimates the beam from each emitter segment, respectively, at the slow axis, and allows each laser beam to fill each micro cylindrical lens aperture at the slow axis. Although the laser beam is collimated by CLA, the divergence angle can still be larger than 5° at the slow axis. This means that, after the transmission of 800 mm, the beam cross section will become 80 mm if the starting dimension is 10 mm. As an example, a telecentric optical system can be used as the large distance relay. If this telecentric relay is a 4f system with a magnification of 1:1, comprising cylindrical lens CL1 and CL2 as shown in FIG. 21(a) and 21(c), the divergent beam LB from CLA is collimated by CL1 and focused by CL2 at aperture AP. In FIG. 21(c), f is the focal length of CL1 and CL2. The laser beam dimension including the divergence angle at AP is the same as it leaves from CLA.

Therefore, with laser diode array modules, laser beam can transmit a long distance, such as 1m or longer, and still substantially preserve the brightness as from the LDAC, and concentrate at small area on AP. With laser diode array modules, it becomes not critical whether the beam from a LDAC is substantially collimated or not. The dimension of beam from a LDAC can be kept substantially the same after a long distance transmission.

Figure 21A:
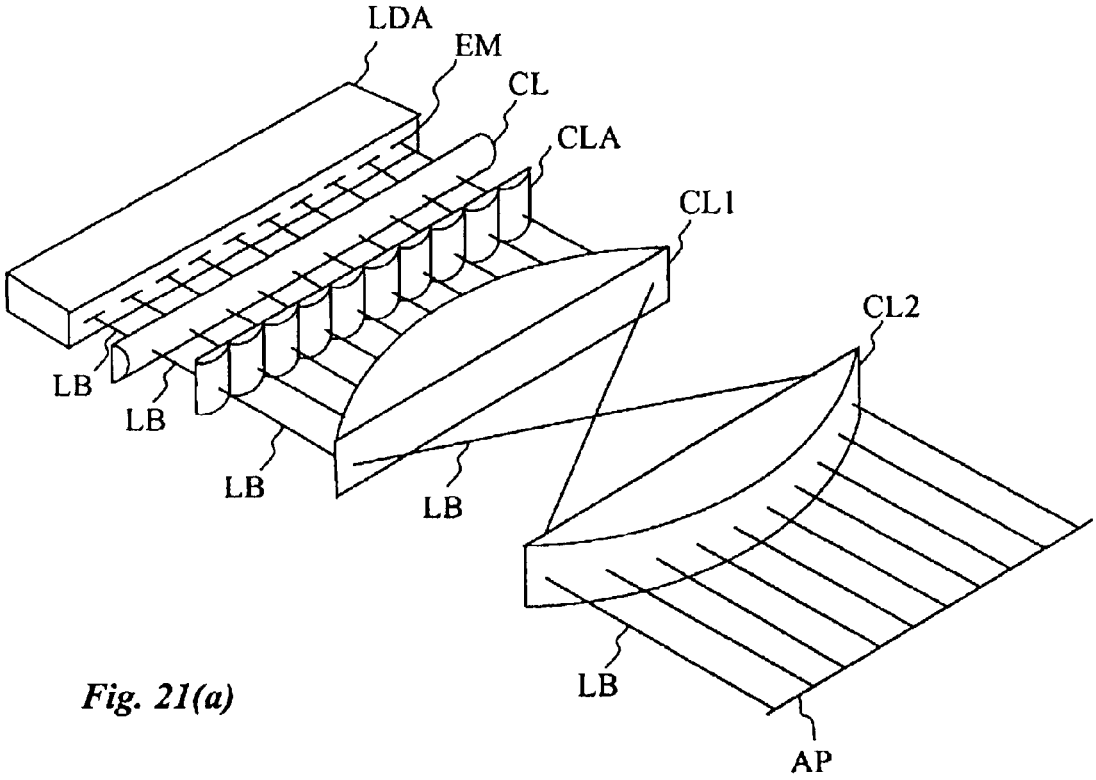
FIG. 21(a) is a schematic illustration showing an example of a laser diode array module used for multiple laser diode array pumping, with the side view in FIG. 21(b) showing that beam dimension can be kept the same for a very long distance.
Figure 21B:
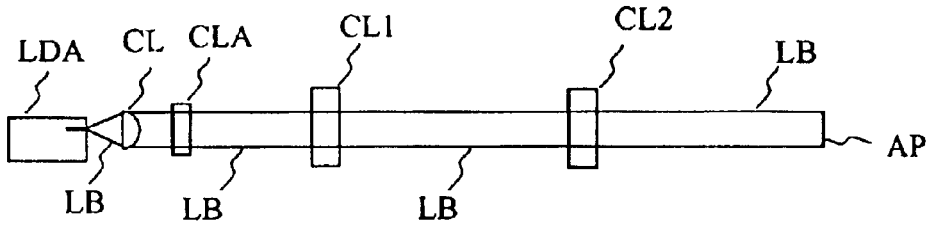
FIG. 21(c) is a schematic drawing showing a 4f telecentric relay with a magnification of 1:1, comprising cylindrical lens CL1 and CL2.
FIG. 21(d) is a schematic illustration showing a cylindrical telecentric relay for a laser diode array module with a non-1:1 magnification.
Figure 21C:
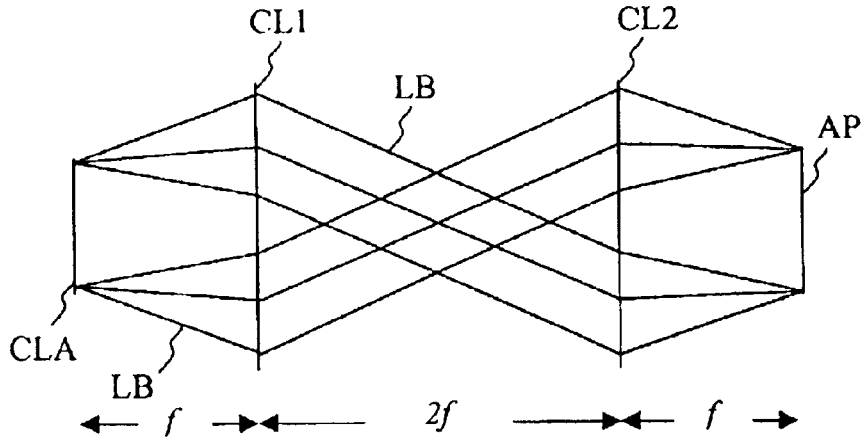
Figure 21D:
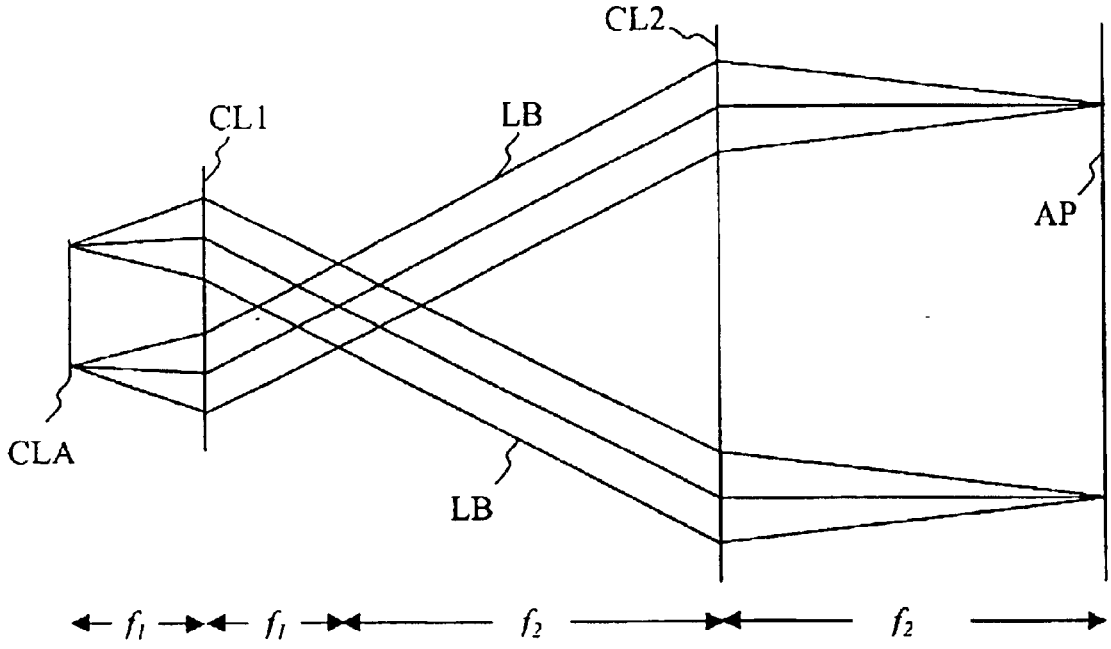

FIG. 21(d) shows a cylindrical telecentric relay for a laser diode array module with a non-1:1 magnification, wherein $f_1$ and $f_2$ is the focal length of CL1 and CL2, respectively. Since the magnification is variable ($f_2/f_2$), the image dimension of the laser diode array at AP is variable at the slow axis, so that it is possible to make the laser beams have substantially the same dimensions at the slow axis and at the fast axis.

4. Combination of multiple laser diode array modules

Figure 22:
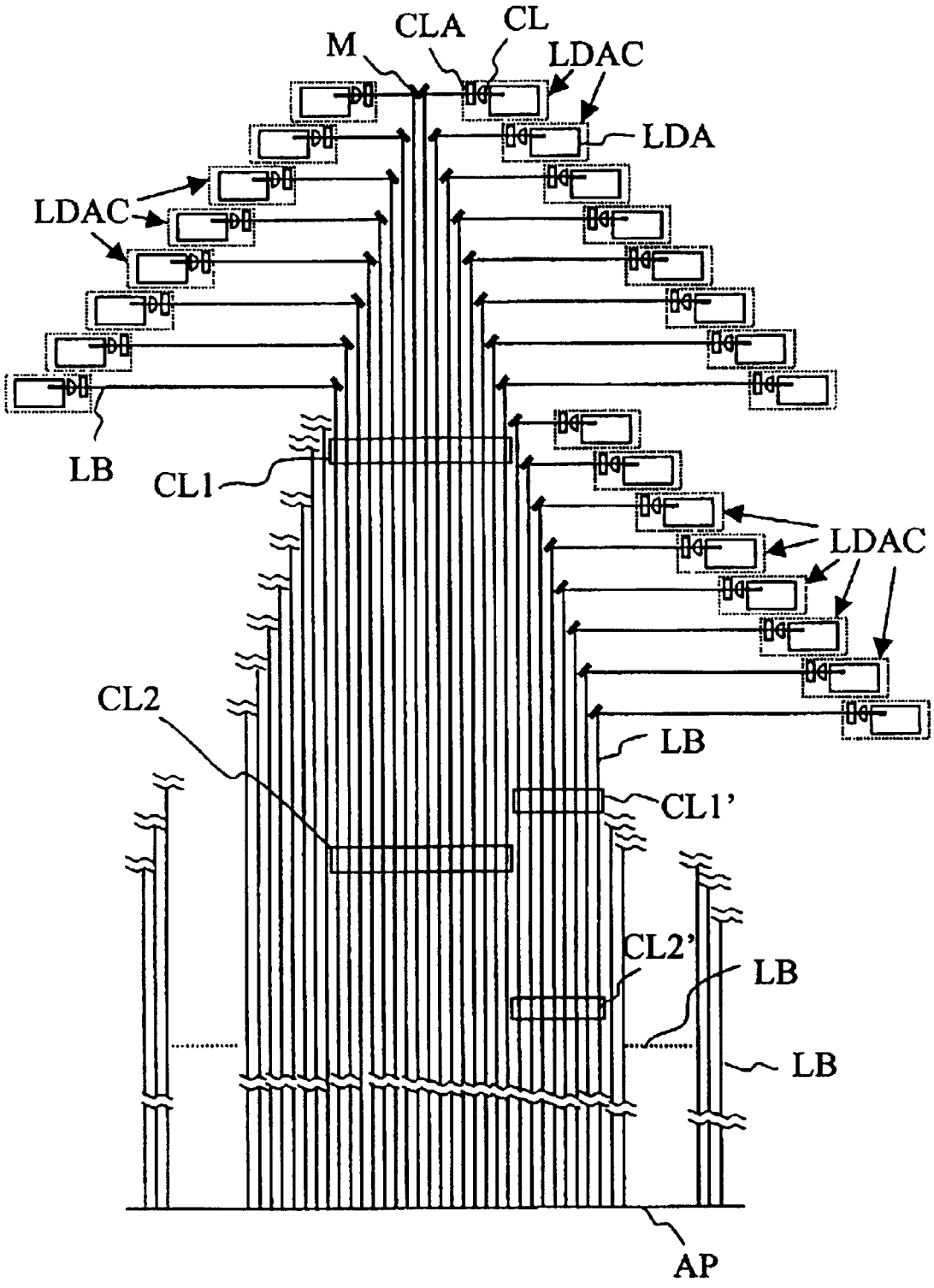
FIG. 22 is a schematic illustration partially showing the combination of multiple laser diode array modules wherein the components are not in proportion, and many components and light beams are not shown for easy understanding.

We can combine multiple laser diode array modules as shown in FIG. 22, where LDA's are laser diode arrays with heat sink. Each LDAC composes an LDA, a cylindrical lens CL and a cylindrical lens array CLA. Assuming the thickness of each LDAC is 10 mm, and the distance between each LDAC is larger than 10 mm for thermal management. If there are 50–100 pieces of LDAC's at one side of the aperture AP, the largest distance from LDA to AP may be as much as 500–1000 mm. Using relays to form modules as mentioned above, the laser beams from all the laser diode array modules can be projected onto AP. In the figure, M's are small mirrors that direct the laser beams form LDA to the aperture AP in parallel.

The LDAC's in FIG. 22 can be divided into several groups if preferred. Therefore, although the distances of each LDAC could be different from the other, each group can be made to have the same total distance to AP. In this case one set of large telecentric relay lens (CL1 and CL2, or CL1' and CL2') will be enough for each group. Thus in this example, one module comprises a plurality of LDAC's and one set of relay system.

With the scheme in FIG. 22, the dimension of laser beams at the fast axis from the laser diode array modules can be kept substantially constant over a long distance. The center to center distance at the first axis between beams is just equal to the beam dimension at the fast axis. Therefore, if the dimension of each laser beam is 0.8 mm at the fast axis, the total dimension at the fast axis for laser beams from 200 pieces of laser diode array modules will be about 160 mm at AP.

By using cylindrical lens to focus the beam at the fast axis into a beam of NA 0.45, the aperture of the lens is equal to the focal length. When f=160, the dimension of the focal spot at the fast axis will be 0.16 mm since the divergence angle of the beam is 0.001 rad. If a 4f 1:1 relay is used in the laser diode module, the aperture in the other direction will still be 10 mm. By focusing with cylindrical lens having f=10, the dimension of the focal spot at the slow axis will be 0.75 for LDAC2 and 0.5 for LDAC3.

If the non 1:1 telecentric relay shown in FIG. 21(d) is used, the aperture at the slow axis can be 160 mm, and the divergence angle demagnified to 1/16. A spherical lens can then be used to focus the beams into NA 0.45, and the focus spot dimension is the same as before.

With the components described above, such as laser diode array modules and claddings, a high-efficiency fiber laser can be obtained, comprising at least one laser diode array module, a laser fiber with its core doped with active species, and an imaging optical system, wherein said imaging optical system is disposed between said module and the aperture of said fiber and focuses the beam from said module onto the aperture of said laser fiber. Said imaging optical system can include lens and mirrors. For high-power fiber lasers, a plurality of said modules are used. If desired, more than 200 modules can be used. It is preferred that there is a symmetry-broken inner cladding or a multiple-imaging cladding surrounding the core of said laser fiber. Said symmetry-broken cladding can be a symmetry-broken circular cladding, a symmetry-broken rectangular cladding, or other symmetry-broken cladding. Said multiple-imaging cladding can be a rectangular-like multiple-imaging cladding or other multiple-imaging cladding.

Said laser diode array module is a system comprising at least one laser diode array, a collimating structure, and at least one optical relay system. It is preferred that said optical relay system is a 1:1 4f cylindrical relay, or include a non-1:1 cylindrical telecentric relay. Said collimating structure can include a plurality of fold prisms.

It is obvious to the skilled in the art, with the same principle, the methods described above can also be used for pumping solid-state laser rods. This can be easily realized if the laser fiber described above is replaced with a laser rod. Of course, it is preferred if the rod dimension substantially equal to or larger than the beam dimension from these systems. Therefore, a high-efficiency diode-pumped solid state laser can be made, comprising at least one laser diode array module, a laser rod doped with active species such as rare-earth or transition metal ions like Nd, Yb, Er, Pr, and so on, and an imaging optical system, wherein said imaging optical system is disposed between said module and the aperture of said laser rod and focuses the beam from said module onto the aperture of said laser rod. Said imaging optical system can include lens and mirrors. For high-power diode-pumped solid state lasers, a plurality of said modules are used. If desired, more than 200 modules can be used. Said laser diode array module is a system comprising at least one laser diode array, a collimating structure, and at least one optical relay system. It is preferred that said optical relay system is a 1:1 4f cylindrical relay, or include a non-1:1 cylindrical telecentric relay. Said collimating structure can include a plurality of fold prisms.

These methods and systems described above can also be used for transmission of power from laser diode arrays through an optical fiber. High power can be transmitted because the method disclosed above allowing high efficiency in coupling laser power from a plurality of laser diode arrays into an optical fiber. The high power transmitted in the optical fiber can then be used, for instance, for material processing and medical surgery directly. Therefore, an apparatus for laser beam transmission using an optical fiber can be made, comprising an optical fiber for laser transmission, at least one laser diode array module, and an imaging optical system, wherein said imaging optical system is disposed between said module and the aperture of said fiber and focuses the beam from said module onto the aperture of said optical fiber, and wherein said laser diode array module comprises at least one laser diode array, a collimating structure, and an optical relay system. Said imaging optical system can include lens and mirrors. For high power transmission, a plurality of said modules are used. It is preferred that said optical relay system is a 1:1 4f cylindrical relay, or include a non-1:1 cylindrical telecentric relay. Said collimating structure can include a plurality of fold prisms.

The foregoing descriptions of embodiments of the invention have been presented for the purpose of illustration and description. It is not intended to limit the invention to the precise form disclosed, and obviously many modification and variation are possible in light of above teaching. For example, symmetry-broken polygon or other multiple-imaging configurations can be used as fiber inner cladding. Fold prisms can be used in cascade to further shrink the beam dimension at the slow axis. Multiple lenses can be used as the relay system at the slow axis for a brightness substantially-conserved laser diode array module. Multiple relays can also be used in cascade. The embodiments were chosen and described in order to best explain the principles of the invention and its practical applications to thereby enable others skilled in the art to best utilize the present invention. While specific values have been used and listed in the foregoing embodiments for the sake of easy to understand, they do not set limit on the invention teaching, which is properly described in the claims. The particular values and configurations discussed above can be varied and are cited merely to illustrate particular embodiments of the present invention and are not intended to limit the scope of the present invention.

What is claimed is:

1. A high-efficiency cladding pumping fiber laser apparatus comprising:

a laser fiber having cladding [with its] *having a* core doped with at least one active species *and defining an aperture*, at least one laser diode array module[,] *for emitting a laser beam with a beam spot dimension*, an imaging optical system, wherein [said] *the* imaging optical system is disposed between [said] *the* laser diode *array* module and [an] *the* aperture of [said] *the* laser fiber and focuses the *laser* beam from [said] *the laser diode array* module onto the aperture of [said] *the* laser fiber; and wherein [said] *the* laser diode array module comprises at least one laser diode array with [a] *the* beam having fast and slow axis divergence, a collimating structure, and an optical relay system; and wherein [said] *the imaging* optical [relay] system has at least one optical element for beam relay and is disposed between [said] *the* laser diode array *module* and [said] *the* laser fiber, whereby the laser beam from [said] *the* laser diode array *module* is relayed to a more distant point with the beam spot dimension being kept substantially unchanged.

2. [An] *The* apparatus of claim 1, wherein [said] *the* laser fiber has a symmetry-broken inner cladding surround the core of [said] *the* laser fiber.

3. [An] *The* apparatus of claim 2, wherein [said] *the* symmetry-broken cladding is symmetry-broken circular cladding.

4. [An] *The* apparatus of claim 2, wherein [said] *the* symmetry-broken cladding is symmetry-broken rectangular cladding.

5. [An] *The* apparatus of claim 1, wherein [said] *the* laser fiber has a multiple-imaging cladding surrounding the core of [said] *the* laser fiber.

6. [An] *The* apparatus of claim 5, wherein [said] *the* multiple-imaging cladding is rectangular-like multiple-imaging cladding.

7. [An] *The* apparatus of claim 1, wherein [said] *the* optical relay system is a cylindrical lens.

8. [An] *The* apparatus of claim 1, wherein [said] *the* optical relay system is a 1:1 4f cylindrical relay.

9. [An] *The* apparatus of claim 1, wherein [said] *the* optical relay system is a non-1:1 cylindrical telecentric relay.

10. [An] *The* apparatus of claim 1, wherein [said] *the* collimating structure includes a plurality of fold prisms.

11. A high-efficiency diode-pumped solid state laser apparatus comprising:

a laser rod doped with active species *defining an aperture*, at least one laser diode array module *for emitting a beam with a beam spot dimension*, an imaging optical system, wherein [said] *the* imaging optical system is disposed between [said] *the* laser diode *array* module and [an] *the* aperture of [said] *the* laser rod and focuses the beam from [said] *the laser diode array* module onto the aperture of [said] *the* laser rod; and wherein [said] *the* laser diode array module comprises at least one laser diode array with [a] *the* beam having fast and slow axis divergence, a collimating structure, and an optical relay system; and wherein [said] *the* optical relay has at least one optical element for beam relay and is disposed between [said] *the* laser diode array and [said] *the* laser rod, whereby the laser beam from [said] *the* laser diode array *module* is relayed to a more distant point with the beam spot dimension being kept substantially unchanged.

12. [An] *The* apparatus of claim 11, wherein [said] *the* optical relay system is a cylindrical lens.

13. [An] *The* apparatus of claim 11, wherein [said] *the* optical relay system is a 1:1 4f cylindrical relay.

14. [An] *The* apparatus of claim 11, wherein [said] *the* optical relay system is a non-1:1 cylindrical telecentric relay.

15. An apparatus for laser beam transmission comprising:

an optical fiber for laser beam transmission, at least one laser diode array module *for emitting a beam with a beam spot dimension*, an imaging optical system, wherein [said] *the* imaging optical system is disposed between [said] *the laser diode array* module and [an] *the* aperture of [said] *the* optical fiber and focuses the beam from [said] *the* module onto the aperture of [said] *the* optical fiber; and wherein [said] *the* laser diode array module comprises at least one laser diode array with [a] *the* beam having fast and slow axis divergence, a collimating structure, and an optical relay system; and wherein [said] *the* optical relay has at least one optical element for beam relay and is disposed between [said] *the* laser diode array and [said] *the* optical fiber, whereby the laser beam from [said] *the* laser diode array is relayed to a more distant point with the beam spot dimension being kept substantially unchanged.

16. [An] *The* apparatus of claim 15, wherein [said] *the* optical relay system is a cylindrical lens.

17. [An] *The* apparatus of claim 15, wherein [said] *the* optical relay system is a 1:1 4f cylindrical relay.

18. [An] *The* apparatus of claim 15, wherein [said] *the* optical relay system is a non-1:1 cylindrical telecentric relay.

*19. An apparatus for a high efficiency cladding pumping fiber laser component comprising:*

*a laser fiber including a core doped with active species disposed along an axis;*

*a symmetry-broken inner cladding surrounding said core for transmitting optical energy from the inner cladding to said core;*

*the symmetry-broken inner cladding having a substantially rectilinear cross-section with respect to the axis with at least two pair opposing sides; and,*

*at least one side of each pair of each opposing sides disposed in nonparallel relationship to its respective opposed side whereby the inner cladding has a symmetry-broken cross-section shape that minimizes local modes in the inner cladding.*

*20. The apparatus for a high efficiency cladding pumping fiber laser in accordance with claim 19 wherein:*

*each of the opposing sides are disposed in nonparallel relationship with respect to a rectangle.*

*21. The apparatus for a high efficiency cladding pumping fiber laser in accordance with claim 19 wherein:*

*the at least one side disposed in nonparallel relationship includes a first segment disposed in a first nonparallel relationship and a second segment disposed in a second nonparallel relationship.*

*22. The apparatus for a high efficiency cladding pumping fiber laser in accordance with claim 19 including:*

*an outer cladding disposed adjacent the inner cladding.*

*23. A high efficiency cladding pumping fiber laser component comprising:*

*a laser fiber including a core doped with active species disposed along an axis;*

*a symmetry-broken inner cladding surrounding said core for transmitting optical energy from the inner cladding to said core;*

*at least one light path disposed along the symmetry-broken inner cladding;*

*the symmetry-broken inner cladding having a cross-section shape that includes multiple imaging cladding surrounding the core between the light path and the laser fiber whereby the inner cladding has a symmetry-broken cross-section shape that minimizes local modes in the inner cladding.*

*24. The high efficiency cladding pumping fiber laser component of claim 23, wherein*

*said multiple-imaging cladding is rectangular-like multiple-imaging cladding.*

*25. The high efficiency cladding pumping fiber laser component of claim 23, further including:*

*an outer cladding disposed adjacent the inner cladding.*

* * * * *